Aug. 14, 1951
R. C. EATON
2,564,471
BALANCED PHASE DETECTOR
Filed July 21, 1949
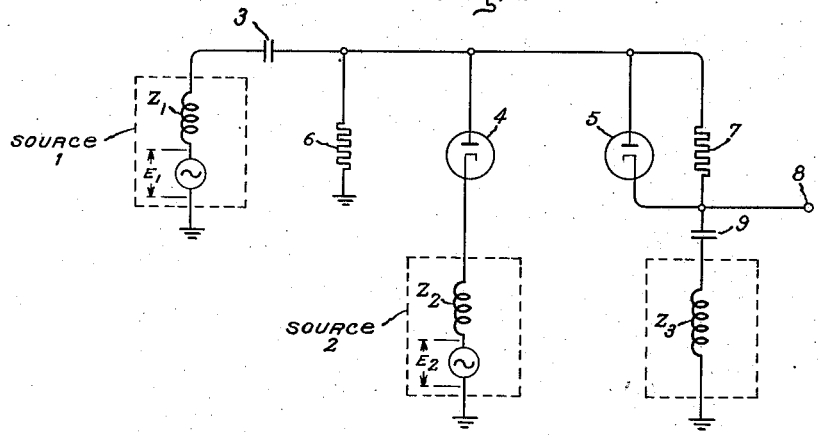
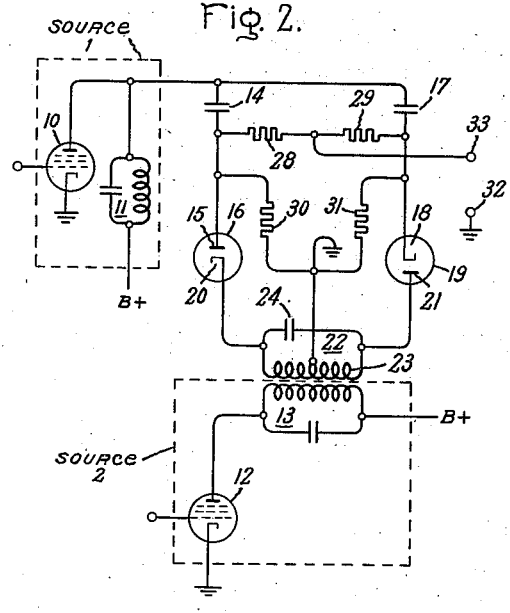
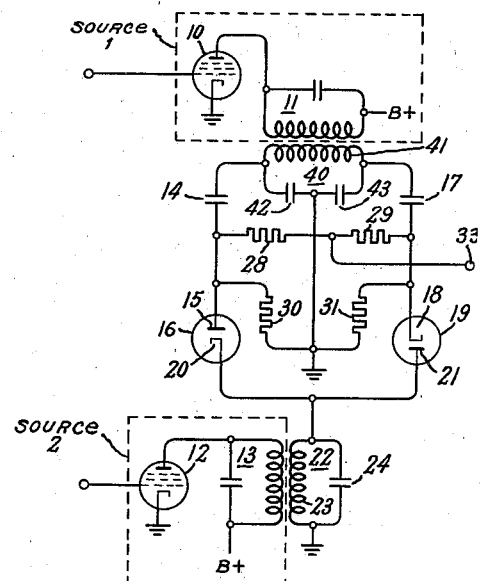
Inventor:
Richard C. Eaton,
by Merton D Morse
His Attorney.

Patented Aug. 14, 1951

2,564,471

UNITED STATES PATENT OFFICE 2,564,471

BALANCED PHASE DETECTOR

Richard C. Eaton, North Syracuse, N. Y., assignor to General Electric Company, a corporation of New York Application July 21, 1949, Serial No. 105,946

5 Claims. (Cl. 250—27)

1

This invention is concerned with phase detectors generally, and relates particularly to a phase detecting circuit for producing a voltage whose amplitude varies in accordance with the phase angle between a pair of synchronous voltages. The invention relates also to a demodulation circuit for producing a voltage having a frequency equal to the difference in frequency between a pair of non-synchronous alternating voltages.

My invention provides a circuit particularly adapted to serve as a detector or demodulator in a single side band communication system, such as described in application Serial No. 785,259 of Donald E. Norgaard, filed November 12, 1947, entitled Selective Side Band Transmission and Reception, and assigned to the same assignee as the present invention.

It is an object of my invention to provide an improved phase detector circuit adapted to operate with a pair of synchronous voltage sources, and having a high degree of stability.

Another object of my invention is to provide a new and improved demodulation circuit for producing an output voltage having a frequency equal to the difference in frequency of a pair of input voltages.

A further object of my invention is to provide a demodulation circuit for operation with a pair of non-synchronous voltage sources which is inherently balanced in its construction so that its output voltage is inherently free from even harmonic distortion.

For further objects and advantages and for a better understanding of the invention, attention is now directed to the following description and accompanying drawings. The features of the invention believed to be novel are more particularly pointed out in the appended claims.

In the drawings:

Fig. 1 is a schematic diagram of a phase detector similar to that disclosed in the aforementioned Norgaard application Serial No. 785,259.

Fig. 2 is a schematic diagram of a phase detector circuit embodying my invention which may also be used as a demodulation circuit for non-synchronous waves.

Fig. 3 is a schematic diagram of a modified version of my phase detector circuit which is particularly suited to use as a demodulation circuit in a single side band communication system.

Referring to Fig. 1, there is shown a pair of voltage sources 1 and 2. These sources provide alternating voltages $E_1$ and $E_2$ respectively, and

2 have internal impedances which will be designated respectively by the symbols $Z_1$ and $Z_2$. Source 1 is coupled through a capacitor 3 to the anodes of a pair of diodes 4 and 5. Source 2 is connected between the cathode of diode 4 and a common point hereinafter referred to as ground. A resistor 6 connects the anode of diode 4 to ground and a similar resistor 7 connects the anode of diode 5 to its cathode. The cathode of diode 5 is directly connected to an output terminal 8 and is also connected to ground through a capacitance 9 and a series impedance designated $Z_3$.

When operating under conditions such that source 1 applies a continuous signal $E_1$ to the anodes of diodes 4 and 5, and source 2 applies no signal to the cathode of diode 4, diodes 4 and 5 both operate as peak detectors. Capacitor 3 charges negatively to a potential approximately equal to the peak value of the applied voltage $E_1$. The negative charge on capacitor 3 is dissipated equally through resistors 6 and 7 and produces equal voltage drops thereacross. Accordingly, the capacitor side of resistor 6 is at the peak negative potential whereas its grounded side is naturally at zero potential. Since an identical current flows through resistor 7, its lower side, that is, the side having a connection to terminal 8, also assumes zero potential.

The conditions above wherein the unidirectional voltage at terminal 8 is zero, presupposes that source 2 produces no voltage and that its internal impedance $Z_2$ is equal to the impedance $Z_3$ connecting terminal 8 to the common ground point. Also, capacitor 9 must present zero reactance to voltages of the frequency of source 1, but must present a large reactance at low frequencies. Under any other conditions, the voltage at terminal 8 would not be zero.

If now, source 2 produces a voltage $E_2$ isochronous with the voltage $E_1$ from source 1 (that is, a voltage of the same frequency and having identical phase as that from source 1) the potential at the cathode of diode 4 varies in the same phase as the anode potential. The result then is to rduce the effective magnitude of the potential from source 1 existing across diode 4, and the rectified voltage causing direct current to flow through resistor 6 is reduced by an amount corresponding to the peak value of the voltage $E_2$ supplied by source 2. The unidirectional current flowing in resistor 7, however, is unaffected by the application of voltage $E_2$ from source 2, and the same voltage drop continues to exist across resistor 7. Accordingly, the potential at terminal 8 changes from zero to a positive value equal to the peak value of voltage $E_2$ supplied from source 2. If voltage $E_2$ is varied to have the same frequency as voltage $E_1$, but to be 180° out of phase therewith, a negative unidirectional potential of the same magnitude is produced at terminal 8.

If now voltage $E_2$ is adjusted to be in quadrature phase relationship with voltage $E_1$, the potential at terminal 8 will be restored to zero. This results from the fact that the voltage $E_2$ at the cathode of diode 4 then passes through zero at the instant when current is being drawn by the anode. This results from the well known fact that current in a peak detector flows only at the crests of the alternating cycles. Accordingly, $E_2$ has no effect on the current circulating through resistor 6 which remains equal to that circulating through resistor 7 with the result that terminal 8 assumes zero potential. With intermediate phase relations, voltages of intermediate magnitude and polarity occur at terminal 8.

If voltage $E_2$ from source 2 has a frequency different from that of voltage $E_1$ from source 1, the potential at conductor 8 varies at a rate equal to the difference between the frequencies of sources 1 and 2. The circuit under these conditions may be employed as a demodulator of waves of different frequencies applied from sources 1 and 2. To operate as a linear demodulator, a reference frequency voltage may be supplied by source 1, and a modulated signal by source 2. The demodulated output is then of a frequency equal to the difference in frequency of the two sources and is linear in character, provided the modulated signal has a considerably lesser amplitude than the reference voltage.

The circuit of Fig. 1 that has been described, involves certain problems in some applications. Thus in some instances, it is necessary that the internal impedance $Z_2$ of the source 2 be equal to the impedance $Z_3$ connected between terminal 8 and ground. While this may be provided at one frequency, it is at times difficult to achieve this relationship over a wide range of frequencies. Moreover, if the circuit is to operate effectively, the internal impedance of source 2 must be reasonably low to signals of the frequency of source 1, as, otherwise, diode 4 would not operate effectively as a peak detector. In electronic apparatus wherein most generators take the form of tuned circuits connected to the anodes of electron discharge devices, which devices require high impedance loads for an efficient transfer of energy, it is difficult to achieve a suitably low value for impedance $Z_2$.

In accordance with my invention, I provide a balanced bridge detector, wherein suitable values of impedance may be achieved more readily with the use of electronic tube circuits and wherein the degree of balance required is much less critical.

Referring to Fig. 2, source 1 is now constituted by a conventional electronic tube circuit comprising a pentode discharge device 10 having its anode connected to a tuned circuit 11. Source 2 is likewise constituted by a pentode discharge device 12 having its anode connected to a tuned circuit 13. Circuits 11 and 13 may both have reasonably high impedances in order to provide efficient operation in conjunction with the well known characteristics of such devices. Source 1 is connected through a capacitor 14 to the anode 15 of a diode rectifier 16, and through capacitor 17 to the cathode 18 of a diode rectifier 19. Cathode 20 and anode 21, of diodes 16 and 19 respectively, are connected to the opposite terminals of a tuned circuit 22 comprising an inductance 23 and a capacitor 24. The center point of inductance 23 is connected to a common point, which is indicated as ground. Inductance 23 is coupled to the inductance comprised in tuned circuit 13 of source 2. Anode 15 and cathode 18 are connected together through a pair of similar resistors 28 and 29, and are also connected to the common ground point through similar resistors 30 and 31. The common ground point serves as one output terminal 32, and the other output terminal 33 is provided by the junction of resistors 28 and 29.

In operation, circuit 22, comprising inductance 23 and capacitor 24, is tuned to resonance at the frequency of source 1 and is designed to have an impedance which is considerably smaller than resistances 30 and 31. The impedance between the center tap of inductance 23 and either end thereof is equal to one-fourth of the total impedance from end to end of the inductance. Accordingly, the introduction of inductance 22 into the ground return paths of diodes 16 and 19 does not seriously impair the operating efficiency of these diodes as peak detectors.

Since resistors 28 and 29 are equal in value, the potential at their junction, that is at terminal 33, will be halfway between the potentials at anode 15 and at cathode 18. When no signal is supplied from source 2, each diode conducts to the same extent and develops across its associated capacitor, voltages which are equal in magnitude but opposite in polarity. Accordingly, equal voltage drops occur across resistors 28 and 29, and terminal 33 is at ground or zero potential. If resonant circuit 22 is mistuned or if its impedance is altered, the zero voltage condition at terminal 33 will not change since the two peak rectifiers will be affected similarly.

Now, if source 2 is made to develop a voltage $E_2$ across tuned circuit 22, and if this voltage $E_2$ is of the same frequency as voltage $E_1$, the potential at terminal 33 will remain zero when the phase of signal $E_2$ is in quadrature with that of signal $E_1$. This results from the fact that when $E_2$ is either leading or lagging $E_1$ by 90°, the instantaneous voltage applied from source 2 to diodes 16 and 19 is zero during the occurrence of current pulses resulting from voltage $E_1$. If the phase relationship departs from the quadrature condition, the unidirectional potentials at anode 15 and at cathode 18 will be altered in the same direction, either positive or negative, the polarity depending on the direction of the departure from quadrature. Thus the potential at terminal 33 will vary by an amount such that it is equal to half the instantaneous voltage $E_2$ at the instant when diode current flows.

The circuit of Fig. 2 has the advantage that it is not necessary to maintain the internal impedance of sources 1 and 2 in any fixed relationship with other quantities. Thus, even though the internal impedance of device 12 in source 2 should vary over wide limits, diodes 16 and 19 remain inherently balanced, because the balanced condition is due to the symmetry of circuit 22 on both sides of the common ground point in inductance 23.

When the circuit is used as a demodulator, voltages of different frequencies are supplied by sources 1 and 2. Under such operating conditions, the requirement that the impedance between the peak detectors and the common ground point be reasonably low are much more readily met than in the circuit of Fig. 1, because the actual impedance between one end of circuit 22 and the common ground point is only one-fourth the total impedance from end to end thereof. Also, the linear demodulation requirement that $E_2$ be considerably less in magnitude than $E_1$ is not so stringent. Since the circuit is inherently balanced, even harmonic distortion is balanced out, and a lower ratio of $E_1$ to $E_2$ may be utilized than in the circuit of Fig. 1.

Referring to Fig. 3, I have shown therein a phase detector circuit which is particularly adapted for use as a demodulator circuit in a single side band communication system such as described in the abovementioned Norgaard application.

In single side band communication, the intelligence is conveyed by means of one only of the two side bands resulting from ordinary amplitude modulation of a carrier wave. The instantaneous frequency of the side band components is equal to either the sum or the difference of the carrier frequency and the modulating frequency, depending upon whether the upper or lower side band is being considered. A demodulation circuit for recovering the modulating voltage from such a single side band must provide an output voltage having a frequency equal to the instantaneous difference in frequency between the side band and the carrier from which it was derived.

It will be obvious to those skilled in the art that the circuits shown in Figs. 1 and 2 are both capable of demodulating a single side band signal. For instance, in either circuit, a signal equal in frequency and phase to the original carrier from which the single side band signal was derived, may be provided from source 1, a single side band signal may be provided from source 2, and the detected modulating component will then appear at the output terminal.

The same numerals have been used in Fig. 3 as in Fig. 2 to indicate similar circuit components. Circuit 11 in source 1 is now inductively coupled to a crcuit 40 comprising an inductance 41 and a pair of tuning capacitors 42 and 43 having their junction point connected to ground. Cathode 20 of diode 16, and anode 21 of diode 19, now have a common connection to one side of the resonant circuit 22 whose other side is grounded. Source 2 is inductively coupled through its output circuit 13 to inductance 23 in circuit 22.

In the application of the circuit of Fig. 3 as a demodulation circuit for a single side band signal, this signal is provided by source 2, and a reference carrier frequency signal is provided by source 1. The carrier voltage is accordingly developed in push-pull or reversed phase relation at anode 15 of diode 16 and at cathode 18 of diode 19. The single side band signal is applied at the other poles of the diodes and accordingly, operates to cause a change in the same direction of the voltages developed across capacitors 14 and 17.

This circuit has the advantage over that of Fig. 2, that the tuning of circuit 13 in source 2 does not effect the phase angles in the detector, since the same signal is injected into both diodes. This is particularly important in the case of a single side band signal because the instantaneous frequency of the signal varies over a considerable band, depending upon the modulation. On the other hand, the carrier frequency signal applied by source 1 is constant at one frequency and there is no difficulty in adjusting circuit 40 to resonance at this frequency so as to provide a 180° phase difference between the voltages on its opposite sides. This circuit has the additional advantage that the output terminal 33 is connected to a point which is midway between two radio frequency voltages of approximately the same magnitude but of opposite phase, so that this point is very nearly at ground potential. Accordingly, less filtering of the radio frequency voltages is required in a utilization circuit connected to terminal 33.

While certain specific embodiments have been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. An arrangement for demodulating modulated waves with unmodulated waves comprising a pair of detectors, each of said detectors comprising an anode and cathode electrode, means connecting an unlike electrode of each detector to a common junction point, separate impedances connecting the remaining electrodes to a point of reference potential, means applying said modulated waves between said junction point and said reference potential point, means applying said unmodulated waves in phase opposition to the remaining electrodes of said detectors, and an output circuit connected between said remaining electrodes and said reference potential point.

2. A circuit for demodulating a pair of alternating voltages, comprising a pair of rectifiers having one pair of unlike poles coupled to a first input terminal adapted to receive one of said voltages, conductive connections from the other pair of unlike poles to the end terminals of an impedance having a mid-point connection to ground, means for developing the other of said voltages across said impedance, a first pair of resistances connecting said other pair of poles to ground, and a second pair of resistances connecting said other pair of poles to an output terminal.

3. A phase detector circuit for producing a unidirectional potential having an amplitude and polarity varying as the phase angle between a pair of voltages, comprising a pair of rectifiers having one pair of unlike poles coupled to a first input terminal adapted to receive one of said voltages, direct connections from the other pair of unlike poles in said rectifiers to both sides of a resonant circuit comprising an inductance having a mid-point connection to ground, a second input terminal adapted to receive the other of said voltages, means connected to said second terminal for providing inductive coupling to said inductance, a pair of equal resistors connecting said other pair of poles to ground, and a second pair of equal resistors connecting said other pair of poles to an output terminal, said potential occurring between said output terminal and ground.

4. A demodulation circuit comprising a pair of rectifiers each having an anode and a cathode, means for galvanically connecting the anode of one rectifier and the cathode of the other rectifier to a first input terminal adapted to receive a first alternating voltage unbalanced with respect to ground, an inductance bridged by a pair of series connected capacitances having their common series connection connected to ground, capacitive connections from the cathode of said one rectifier and from the anode of said other rectifier to opposite sides of said inductance, a second input terminal adapted to receive a second alternating voltage unbalanced with respect to ground, means connected to said second terminal for inductively coupling said second voltage into said inductance to provide said second voltage in reversed phase relation at said capacitive connections, a first pair of equal resistors connecting the rectifier side of said capacitances to said common ground and a second pair of equal resistors connecting the rectifier side of said capacitances to an output terminal.

5. A demodulation circuit for recovering the modulating signal from a single sideband voltage resulting from the amplitude modulation of a carrier voltage, comprising a pair of rectifiers each having an anode and a cathode, a parallel resonant network comprising an inductive arm and a capacitive arm, said network being tuned to resonance at said carrier frequency, a center point in said capacitive arm connected to a ground point, similar capacitances connecting the anode of one rectifier and the cathode of the other rectifier to opposite sides of said network, a first pair of equal resistances connecting the rectifier sides of said capacitances to ground, a second pair of equal resistors connecting the rectifier sides of said capacitances to an output terminal, a common connection between the other cathode and anode of said rectifiers, and means to apply said single sideband voltage between said common connection and said ground point, said modulating signal appearing at said output terminal.

RICHARD C. EATON.

REFERENCES CITED

The following references are of record in the file of this patent:

UNITED STATES PATENTS

| Number | Name | Date |
| --- | --- | --- |
| 2,173,231 | Koch | Sept. 19, 1939 |